United States Patent
Mildh

(10) Patent No.: US 9,014,090 B2
(45) Date of Patent: *Apr. 21, 2015

(54) METHOD AND AN ARRANGEMENT FOR LEGACY FALLBACK BETWEEN COMMUNICATION NETWORK SYSTEMS

(75) Inventor: Gunnar Mildh, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 221 days.

This patent is subject to a terminal disclaimer.

(21) Appl. No.: 13/618,615

(22) Filed: Sep. 14, 2012

(65) Prior Publication Data
US 2013/0010696 A1 Jan. 10, 2013

Related U.S. Application Data

(63) Continuation of application No. PCT/SE2009/050541, filed on May 13, 2009.

(60) Provisional application No. 61/054,387, filed on May 19, 2008.

(51) Int. Cl.
*H04W 60/00* (2009.01)
*H04W 76/02* (2009.01)
*H04W 36/14* (2009.01)

(52) U.S. Cl.
CPC ............. *H04W 76/02* (2013.01); *H04W 36/14* (2013.01)

(58) Field of Classification Search
None
See application file for complete search history.

(56) References Cited

U.S. PATENT DOCUMENTS

| | | | |
|---|---|---|---|
| 7,009,948 B1 * | 3/2006 | Carlsson et al. | 370/329 |
| 2008/0080428 A1 | 4/2008 | Jappila et al. | |
| 2011/0080867 A1 | 4/2011 | Mildh | |
| 2011/0110228 A1 * | 5/2011 | de Franca Lima et al. | 370/230 |

OTHER PUBLICATIONS

Notice of Opposition dated Feb. 7, 2014 for EP Patent No. EP 2429241 B1 entitled, "Circuit Switched Fallback in Evolved Packet System".

Office Action dated Jan. 20, 2014 for Taiwan Patent Application No. 098116419 entitled,"A Method and an Arrangement for Legacy Fallback Between Communication Network Systems".

(Continued)

*Primary Examiner* — Sulaiman Nooristany

(57) ABSTRACT

A method for handling Circuit Switched Fallback from a Packet Switched domain includes receiving an indication that Circuit Switched Fallback is supported from an eNodeB located within the Packet Switched domain. The method also includes registering to a Circuit Switched domain associated with Circuit Switched Fallback by tunneling Circuit Switched Registration information, via the eNodeB, to the Circuit Switched domain, thereby enabling the User Equipment to setup a Circuit Switched call or receive a Circuit Switched page. The method also includes receiving a Circuit Switched specific parameter setting from the eNodeB. The Circuit Switched specific parameter setting includes decoding information to facilitate decoding of transmissions in the Circuit Switched domain. Additionally, the method includes, after receiving the Circuit Switched specific parameter setting, switching from the Packet Switched domain to the Circuit Switched domain and using the decoding information to access the Circuit Switched domain.

12 Claims, 11 Drawing Sheets

(56) References Cited

OTHER PUBLICATIONS

3GPP TS 23.272 v1.1.0 (Apr. 2008) 3rd Generation Partnership Project; Technical Specification Group Services and System Aspects; Circuit Switched Fallback in Evolved Packet System; Stage 2 (Release 8).

Textbook "IS-95 CDMA and cdma2000" by Vijay K. Garg; cover pages, tabel of contents, pp. 106, 107 and 112-114; published in 2000.

Textbook "WCDMA for UMTS" by Harri Holma and Antti Toskala; cover pages, table of contents, pp. 303-304 and 311-313.

3GPP meeting document TD S2-084280, published on the 3GPP TSG SA WG2 Meeting #65, May 12-16, 2008, Prague, Czech Republic.

Meeting report of 3GPP TSG SA WG2 Meeting #65, May 12-16, 2008, Prague, Czech Republic; cover page, table of contents, chapter 8.11 relating to CS fallback.

3GPP meeting document R2-081894, published on the 3GPP TSG RAN WG2 Meeting #61bis, Mar. 31-Apr. 4, 2008, Shenzhen, China.

Meeting report of 3GPP TSG RAN WG2 Meeting #61bis, Mar. 31-Apr. 4, 2008, Shenzhen, China; pp. 1-6 and 123-127.

3GPP TS 23.272 v1.1.0 (Apr. 2008) Circuite Switched Fallback in Evolved Packet Systems; Stage 2 (Release 8).

3GPP TS 23.401 v8.1.0 (Mar. 2008) General Packet Radio Service (GPRS) enhancements for Evolved Universal Terrestrial Radio Access Network (E-UTRAN) access (Release 8); pp. 1-10, 94-99, 105-112.

3GPP TS 36.300 v8.4.0 (Mar. 2008) Evolved Universal Terrestrial Radio Access (E-UTRA) and Evolved Universal Terrestrial Radio Access Network (E-UTRAN); Overall description; Stage 2 (Release 8); pp. 1-19, 33-35, 38-61, 79-94.

\* cited by examiner

Fig. 1 – Registration to CS domain – PRIOR ART

Fig. 2 – Mobile Terminated CS call – PRIOR ART

Fig. 3 – Mobile Originated CS call – PRIOR ART

Fig. 4 - UE in active mode

Fig. 5 - UE in idle mode, incoming CS call

Fig. 6 - UE in idle mode, outgoing CS call

METHOD AND AN ARRANGEMENT FOR LEGACY FALLBACK BETWEEN COMMUNICATION NETWORK SYSTEMS

CROSS-REFERENCE TO RELATED APPLICATIONS

This application is a continuation of International Application PCT/SE2009/050541 with an international filing date of 13 May 2009, which corresponds to the national-stage entry U.S. application Ser. No. 12/526,788, filed Aug. 12, 2009, and which claims the benefit of U.S. Provisional Application Ser. No. 61/054,387 filed on May 19, 2008, the disclosures of which are incorporated herein by reference.

TECHNICAL FIELD

The described embodiments of present invention relates to a method and an arrangement, in a communication network system, and more particularly, to a method and an arrangement for facilitating fallback from a packet switched environment to a circuit switched environment.

BACKGROUND

The 3rd Generation Partnership Project (3GPP) standardization body is currently working on the specification of the evolved 3G mobile system called Long Term Evolution (LTE) or E-UTRAN. This system will support inter-working with CDMA2000 networks (HRPD) and (1xRTT). The inter-working will be in the form of packet switched (PS) handovers for ongoing IP real-time services between LTE and HRPD as well as handover for ongoing Voice over IP calls from LTE to circuit switched (CS) 1xRTT networks (the latter mechanism is called Voice Call Continuity (VCC)).

The solutions above are described in 3GPP TS36.300 section 10.3.2, and which form part of the prior art. However recently it has also been considered important to introduce support for circuit switched (CS) fallback from LTE to legacy networks, such as Global System for Mobile communications (GSM) and 1xRTT. In short, by Circuit Switched Fallback mechanisms; the CS-domain services are realized by reuse of Circuit Switched infrastructure (radio and core network) and by Circuit Switched fallback is meant that the user equipment (UE) camps on a Packet Switched only system (e.g. E-UTRAN) but switch over to Circuit Switched system (e.g. GERAN/UTRAN) to establish originating Circuit Switched call.

For incoming terminating calls the user equipment is paged in the Packet Switched only system (e.g. E-UTRAN) but respond to the page in the Circuit Switched system. The Circuit Switched fallback mechanism differs from VCC in that the VCC mechanism is applied to on-going services while Circuit Switched fallback is intended to switch directly to the Circuit Switched domain, before setting up any Circuit Switched services.

The principle for the Circuit Switched fallback feature is that the mobile terminal performs registration, while in LTE, to the Circuit Switched domain. Once the terminal then wants to make a Circuit Switched voice call, or receives an incoming paging for a Circuit Switched voice call, it will leave the LTE domain and switch over to the Circuit Switched radio access network (e.g. 1xRTT, GSM) and initiate the call setup in the Circuit Switched network.

A drawback with the above described is that the access delay for the mobile to access the target Circuit Switched system will be quite long, which will have a negative impact on the service performance, i.e. the service interruption time will be long, in the order of seconds depending on the implementation. The reasons for this is that the user equipment need to perform cell search on the 1xRTT carriers, acquire synchronization, read information from broadcast channel etc. before it is able to respond to the incoming page or setup up the mobile originated calls.

It is of course possible to re-use concepts for Packet Switched to Circuit Switched handovers from LTE to 1xRTT in order to speed up the time it takes for the user equipment to access the 1xRTT system. The principle for LTE to 1xRTT handover is based on that resources and signaling are performed towards the 1xRTT system before the user equipment leaves LTE. The concept is also based on that they user equipment are performing measurements on 1xRTT cells prior to leaving LTE. These concepts not only rather complicated and have large impact on both the networks (3GPP and 3GPP2) and terminals, but they are also meant for ongoing services, not for redirection before initiating services.

Then there is also general concept defined for reducing service interruption time at cell change for ongoing Packet Switched based services (e.g. in GERAN/UTRAN), which are well known are used both for handover (when target cell is prepared) and for network assisted or controlled cell re-selection (when the target cell is not prepared but the access delay is still reduced since the user equipment does not need to read broadcast information), again these concepts are not designed for re-directing before initiating services and they are also not directly applicable to the Circuit Switched domain or to 1xRTT which uses other access methods and synch procedures.

SUMMARY

It is the object to obviate at least some of the above described disadvantages and provide an improved method and arrangement for performing a Circuit Switched fallback mechanism from a packet switched domain to a circuit switched domain in order to speed up the time it takes for a user equipment to access a 1xRTT system before initiating services. Thus, in at least one embodiment, the teachings herein provide a method of Circuit Switched fallback (i.e. for handling Circuit Switched Services) in a user equipment, residing in a Packet Switched domain, comprising the steps of receiving, from an eNB located within the packet switched domain, an indication that Circuit Switched fallback (i.e. Circuit Switched Services) is supported and registering the user equipment to a Circuit Switched domain by signalling Circuit Switched Registration information via the eNB, thereby enabling registry to the Circuit Switched domain associated to the Circuit Switched Services, followed by receiving information comprising. Circuit Switched specific parameter setting, to preparing for Circuit Switched fallback and then applying the Circuit Switched specific parameter settings received and switching from the Packet Switched domain to the Circuit Switched domain, leaving LTE.

In at least one embodiment, such Circuit Switched specific parameter settings are receivable in a release and re-direct indication comprising 3Gx1 parameters. Further, in at least one embodiment, such 3Gx1 parameters as specified in C.S0024-A_v3.0 may comprise either 1xRTT frequency band, 1xRTT carrier frequency, PN offset, CDMA system time or Long Code State or a combination thereof.

Furthermore, in at least one embodiment, wherein the user equipment being in idle mode, the method further comprises transiting from idle mode to active mode before receiving the Circuit Switched specific parameter setting. Further, where the user equipment is in idle mode and receiving, an incoming Circuit Switched service, the method in at least one embodiment, comprise receiving a paging message from the eNB.

Also, in at least one embodiment, the teachings herein provide a method of Circuit Switched fallback (i.e. for handling Circuit Switched. Services) in an eNB, residing in a Packet Switched domain, comprising transmitting an indication, that Circuit Switched Services are supported, to a user equipment located within the Packet Switched domain and receiving, either a request for Circuit Switched fallback from a user equipment located within the packet switched domain, or a Circuit Switched fallback indication from a second node, wherein the eNB further transmitting a release indication comprising Circuit Switched specific parameter setting to the user equipment.

In at least one embodiment, such Circuit Switched specific parameter setting is transmittable in a release and re-direct indication and may comprise 3Gx1 parameters. Further, in at least one embodiment, such 3Gx1 parameters as specified in C.S0024-A_v3.0 may comprise 1xRTT frequency band, 1xRTT carrier frequency, PN offset, CDMA system time or Long Code State or a combination thereof.

Also, in at least one embodiment, the teachings herein provide an arrangement in a user equipment for Circuit Switched fallback (i.e. enabling Circuit Switched Services), comprising a receiver or receiving means configured to receiving, from a eNB located within the packet switched domain, an indication that Circuit Switched fullback (i.e. Circuit Switched Services) is supported and a transmitter or a transceiver means configured to transmitting and registering i.e. Circuit Switched Registration signalling via the eNB, enabling registry to the Circuit Switched domain associated to the Circuit Switched Services) to a Circuit Switched domain further comprising a receiver or a receiving means configured to receiving information comprising Circuit Switched specific parameter setting to preparing for Circuit Switched fallback and a processing means for applying the Circuit Switched specific parameter setting received and switching to the Circuit Switched domain.

Also, in at least one embodiment, the teachings herein provide an arrangement for Circuit Switched fallback in an eNB, residing in a Packet Switched domain, comprising a receiver configured to receiving either a request for Circuit Switched fallback from a user equipment located within the packet switched domain, or a Circuit Switched fallback indication from a second node, wherein the eNB further comprise a transmitter configured to transmitting a release indication comprising Circuit Switched specific parameter setting, to the user equipment. In this manner Circuit Switched fallback, is achieved with minimum delay.

An advantage with the above described is the performance improvement experienced by the end-user, using the Circuit Switched tailback feature, by reducing the access delay in the Circuit Switched domain, such as the 1xRTT system for mobile terminated or originating calls. The reduction of the access delay is achieved, while introducing only minor additional complexities in the network and terminal. Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION

The following detailed description refers to the accompanying drawings. The same reference numbers in different drawings may identify the same or similar elements. Also, the following detailed description does not limit the invention.

ABBREVIATIONS/DEFINITIONS

UE User Equipment (mobile terminal)
1xRTT A CDMA2000 system supporting both Circuit Switched and Packet Switched traffic
HRPD or EVDO A CDMA2000 system only supporting Packet Switched traffic
MSC Mobile Switching Center (used for Circuit Switched services)
MME Mobility Management Entity
eNB or eNode B Long Term Evolution (LTE) base station The described concept is different from traditional handover concepts since it is applies the principles to Circuit Switched fallback from one system in a first environment to another system in a second environment and it further deals with Circuit Switched specific parameters, and CDMA2000 specific parameters in particular, like CDMA system time and PN offset that are not used in GERAN/UTRAN.

The basic concept of the embodiments described herein is to, when the mobile terminal/user equipment (UE) 110 in LTE wants to setup a Circuit Switched call or receives a Circuit Switched page, let the LTE network provide the user equipment 110 with information, which will speed up the access towards the 1xRTT system. This information will include parameters such as 1xRTT carrier frequency, 1xRTT system time (Global Positioning System (GPS) Mile used for synchronization), target cell physical cell identity (PN offset) as well as any other information needed by the user equipment 110 in order to access the system.

This information is either static and can be stored in the LTE network or can easily be generated by the LTE network (e.g. the system time), thus avoiding the need to perform any signaling with the 1xRTT network before the 1xRTT transition.

The 1xRTT system time can be expressed as a reference to by the user equipment 110 and network known time in LTE (e.g. a specific system frame number). Which cell the user equipment 110 should go to, can also be statically configured, in order to avoid additional measurements on the 1xRTT cells from LTE (typically the 1xRTT and LTE cells can be co-sited). If these parameters are provided to the user equipment 110 the access delay can be significantly reduced.

Figure 1:
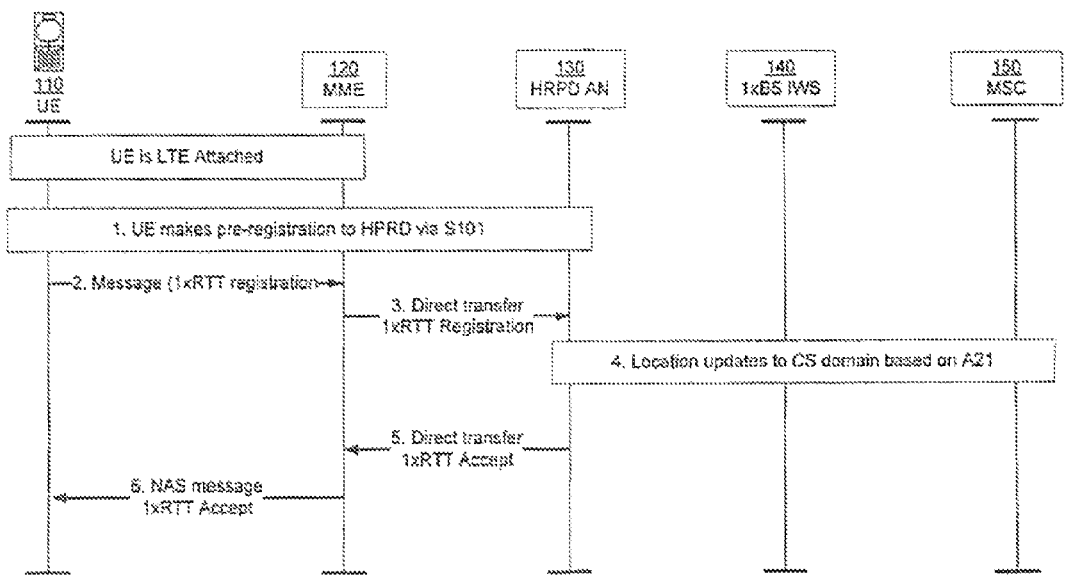
FIG. 1 illustrates registration to a Circuit Switched domain according to prior solutions.

FIG. 1—Illustrates a prior solution to registration to a Circuit Switched domain, the user equipment 110 receives an indication that Circuit Switched fallback is supported, and therefore performs a registration with the Circuit Switched domain. The registration signaling is tunneled transparently through the LTE system via the Mobility Management Entity (MME) 120 towards the CDMA2000 network 420. The detailed signaling path on the CDMA2000 network 420 side is tunneled transparently through the LTE system and, in FIG. 1 is shown the solution when the signaling is piggybacked on registration signaling for HRPD but also other solutions are possible (e.g. where the signaling is performed over the S102 interface between the MME 120 and an 1xCS inter-working function). Once the registration is completed the user equipment 110 is known in the 1xRTT Mobile Switching Centre (MSC) 150 and can from there on receive incoming Circuit Switched calls.

Figure 2:
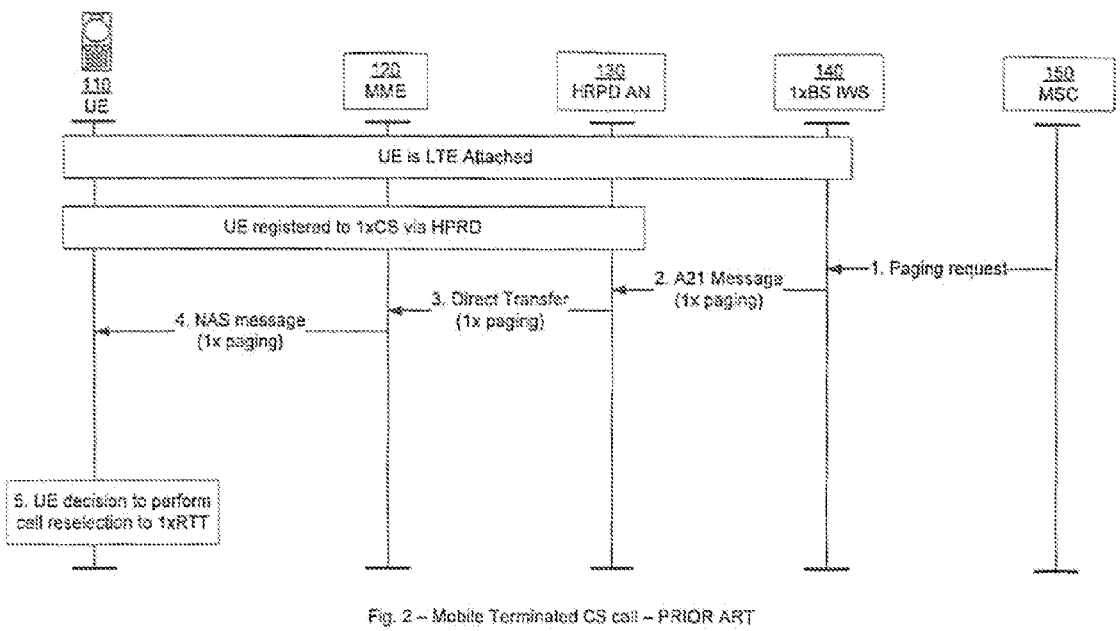
FIG. 2 illustrates a user equipment terminated Circuit Switched call according to prior solutions.

FIG. 2—Illustrates the principle for an incoming Circuit Switched call, wherein a variant of Circuit Switched fallback feature is present, wherein the user equipment 110 performs registration, while in LTE (i.e. it camps in LTE or has ongoing services in LTE and is registered to the Circuit Switched domain), to the Circuit Switched domain. A Mobile Switching Centre (MSC) 150 receives an incoming Circuit Switched voice call and therefore generates a page message which is tunneled to the LTE network Once the terminal then receives an incoming paging for a Circuit Switched voice call, it will leave the LTE domain and switch over to the Circuit Switched radio access network (e.g. 1xRTT, GSM) and perform the page response procedure and initiate the call setup in the Circuit Switched network.

Figure 3:
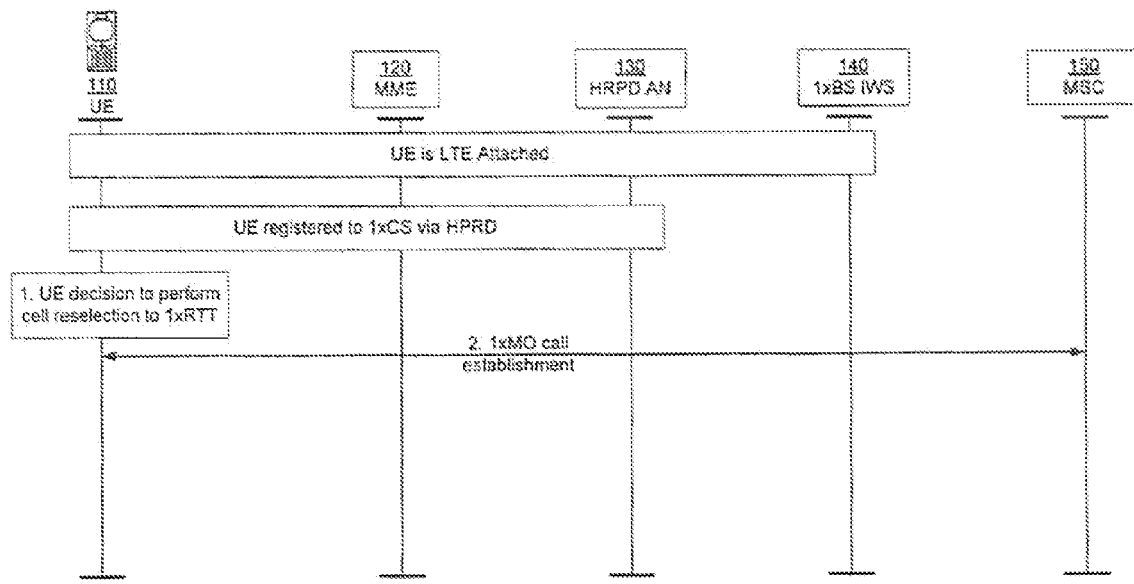
FIG. 3 illustrates a user equipment originated Circuit Switched call according, to prior solutions.
Figure 4:
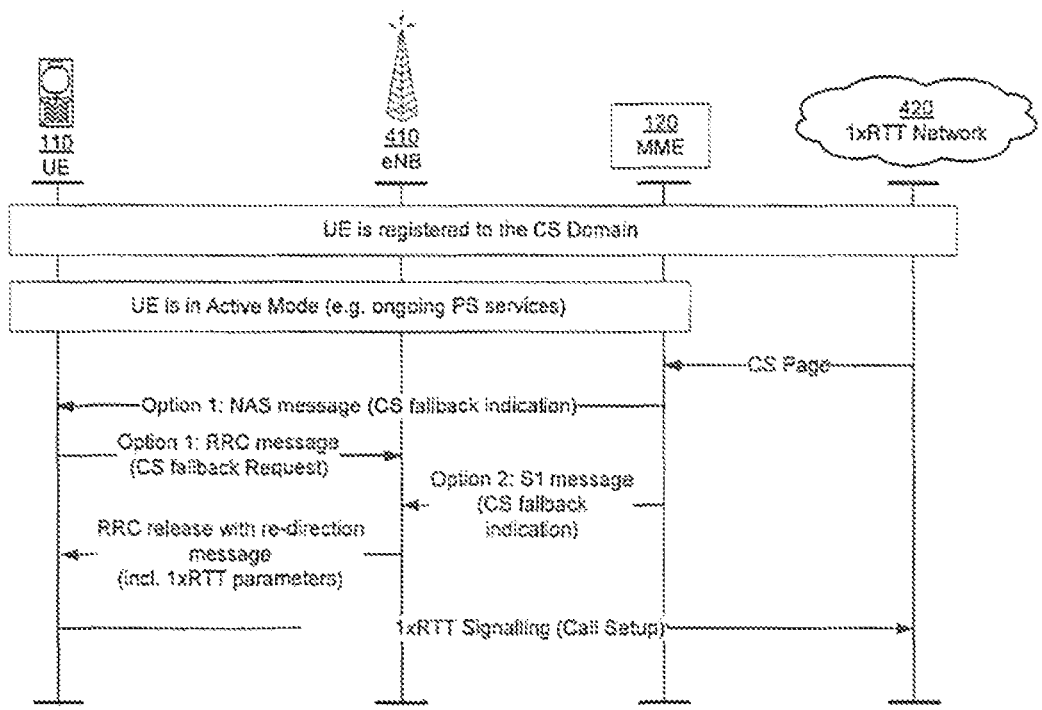
FIG. 4 illustrates the Circuit Switched set up for a user equipment in active mode according to described embodiments of present invention.

FIG. 3—Illustrates the principle for a user equipment 110 originated Circuit Switched call, wherein a variant of Circuit Switched fallback feature is present, wherein the user equipment 110 performs registration, while in LTE, to the Circuit Switched domain. Once the user equipment 110 then wants to make a Circuit Switched voice call, it wilt leave the LTE domain and switch over to the Circuit Switched radio access network 420 (e.g. 1xRTT, GSM) and initiate the call setup in the Circuit Switched network FIG. 4—Enhancements are needed in the current Circuit Switched fallback method, i.e. there is a need for making the eNB 410 aware of the need for a user equipment 110 to perform Circuit Switched fallback. The basic principles are the following; the eNB (E-UTRAN) 410 receives knowledge about that the user equipment 110 is to perform a transition to 1xRTT and setup a Circuit Switched call. How the eNB 410 gets this knowledge is dependent on the mode that the user equipment 110 is currently in (i.e. Idle or Active) and if it is an incoming Circuit Switched call or an originating Circuit Switched call. When the user equipment 110 is active in LTE (e.g. has ongoing data transmission) the eNB can either receive a message from the core network (i.e. MME) 120, or it can receive a message from the user equipment 110, that the user equipment 110 should perform transition to 1xRTT (Circuit Switched).

Figure 5:
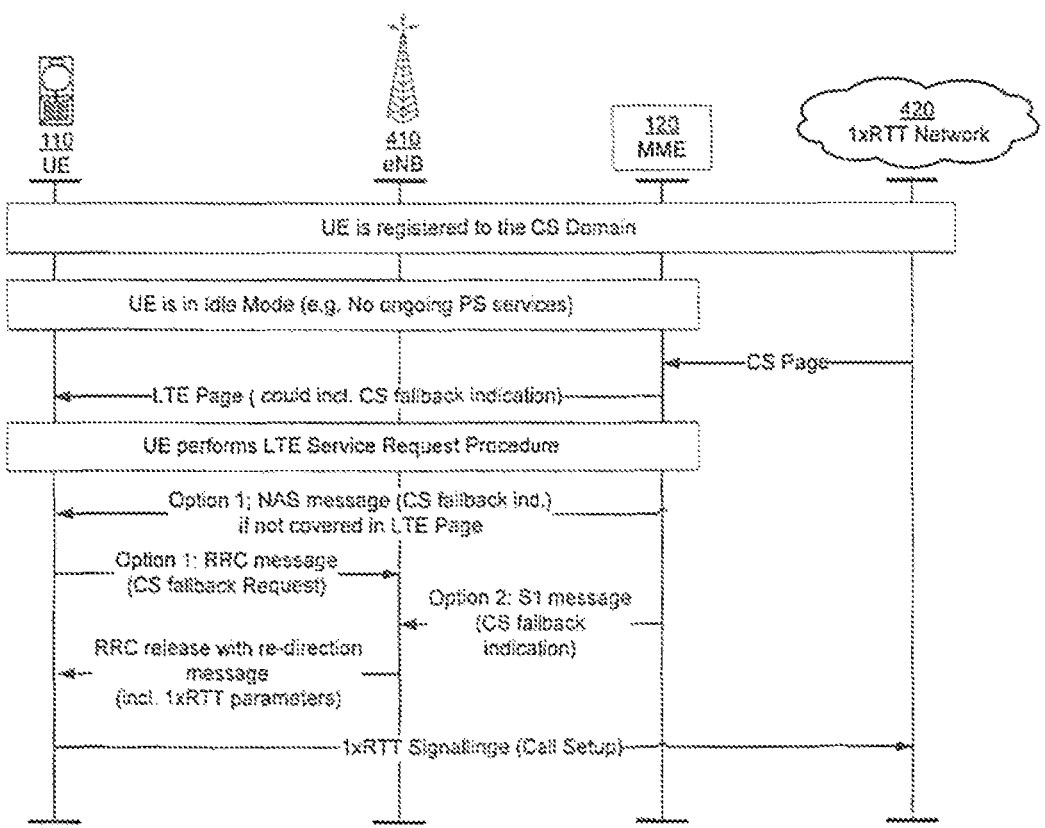
FIG. 5 illustrates the Circuit Switched set up for a user equipment in idle mode, with an incoming Circuit Switched call, according to described embodiments of present invention.

FIG. 5 illustrates the user equipment 110 in idle mode in LTE, where it will, for incoming Circuit Switched call, first receive a page message on the paging channel and then perform a transition to LTE active (using the service request procedure). Once the user equipment 110 is LTE active mode the eNB can either receive a message from the core network (i.e. MME), or it can receive a message from the user equipment, that the user equipment 110 should perform transition to 1xRTT (Circuit Switched).

Figure 6:
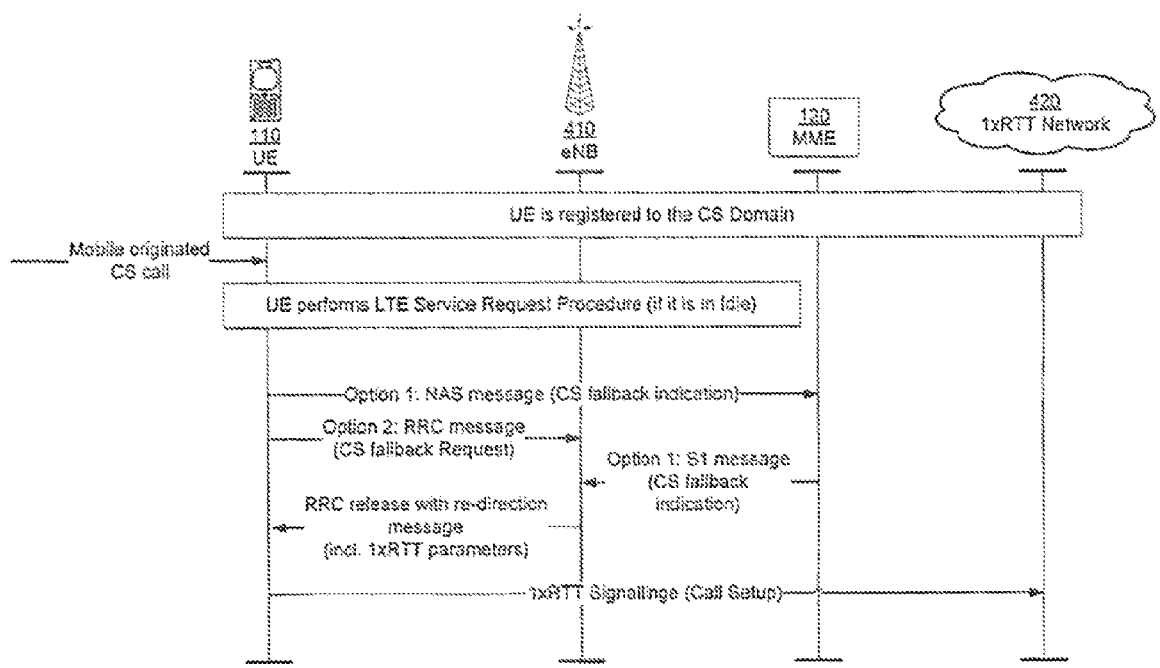
FIG. 6 illustrates the Circuit Switched set up for a user equipment in idle mode, with an outgoing Circuit Switched call, according to described embodiments of present invention.

FIG. 6 illustrates the user equipment 110 in idle in LTE, wherein it wants to perform a Circuit Switched call, then it will first perform a transition to LTE active (using the service request procedure). Once the user equipment 110 is LTE active the eNB 410 can either receive a message from the core network (i.e. MME) 120 or it can receive a message from the user equipment 110 that the user equipment 110 should perform transition to 1xRTT (Circuit Switched).

Figure 7:
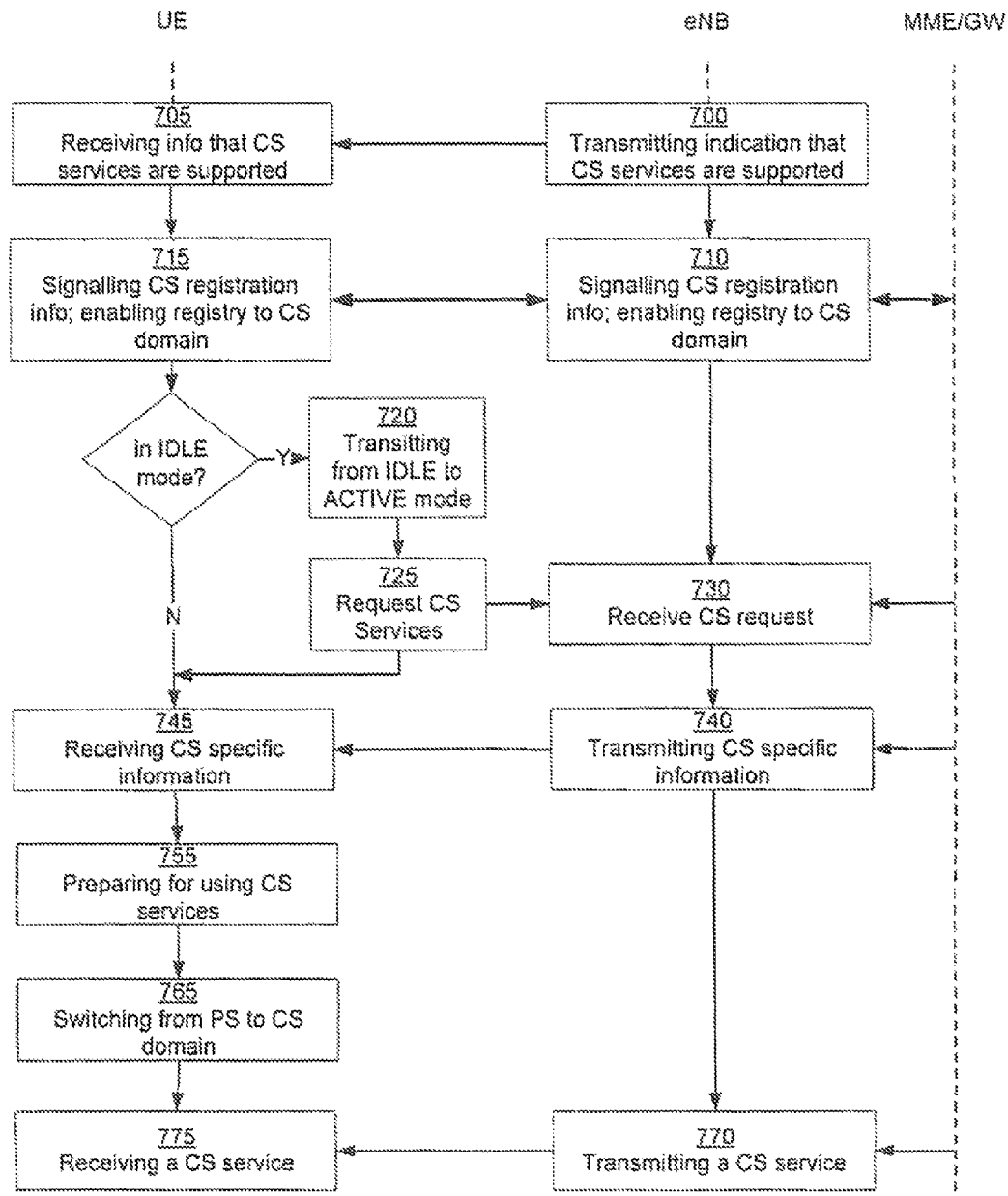
FIG. 7 is a flowchart describing the steps of the described invention.

FIG. 7 is a combined signalling scheme and flowchart of an exemplary process relating to embodiments of the present solution which will be described in detail below.

Figure 8:
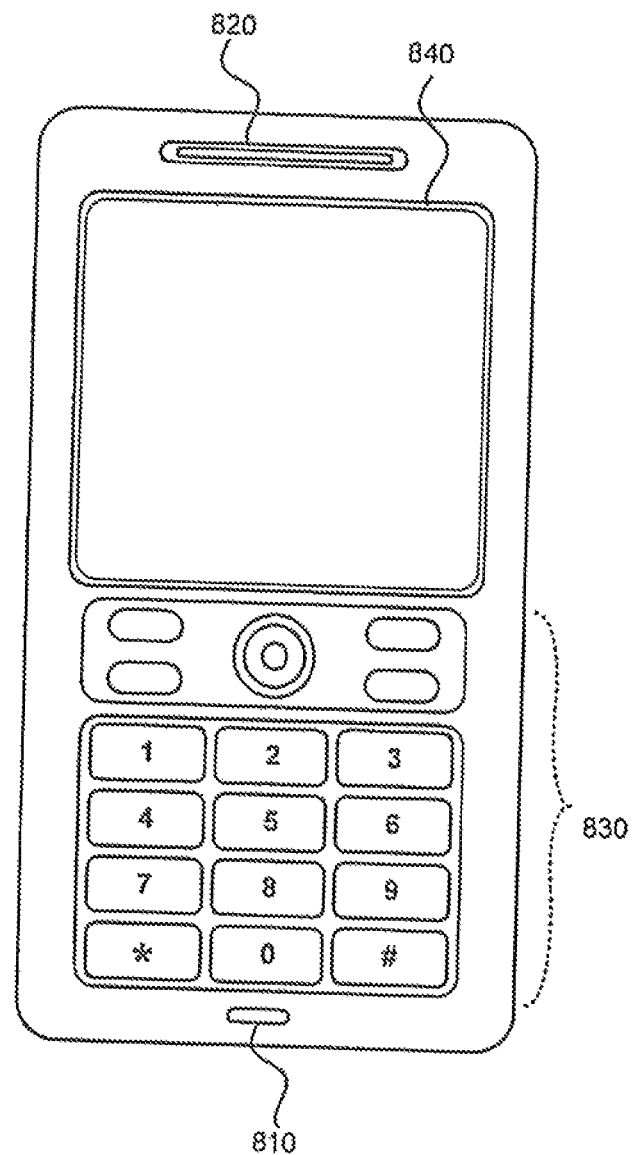
FIG. 8 is an exemplary implementation of a user equipment.

FIG. 8 is a diagram of an exemplary implementation of user equipment 110. In the example illustrated in FIG. 8, user equipment 110 is implemented as a cell phone. User equipment 110 may include a microphone 810, a speaker 820, a group of input elements 830, and a display 840.

Microphone 810 may receive audible information from a user of user equipment 110. Speaker 820 may provide audible information to a user of user equipment 110. Input elements 830 may include control buttons and/or a keypad. The control buttons may permit a user to interact with user equipment 110 to cause user equipment 110 to perform one or more operations. For example, the control buttons may be used to cause user equipment 110 to transmit information. The keypad may include a standard telephone keypad. Display 840 may provide visual information to a user. For example, display 840 may display text input into user equipment 110, text and/or graphics received from another device, and/or information regarding incoming or outgoing calls or text messages, media, games, phone books, address books, the current time, etc.

Although FIG. 8 shows exemplary components of user equipment 110, in other implementations, user equipment 110 may contain fewer, different, or additional components than depicted in FIG. 8. In still other implementations, one or more components of user equipment 110 may perform the tasks described as being performed by one or more other components of user equipment 110.

In FIG. 8, the user equipment 110 is connected to the wireless communication network 420 via a wireless connection to a network node 410. In some embodiments, the user equipment 110 is "RRC connected", where RRC refers to the Radio Resource Control (RRC) protocol that in UTRAN or E-UTRAN, among other things, configures and controls the connection between the base station and the user equipment. I.e. the user equipment 110 is in ACTIVE MODE.

Figure 9:
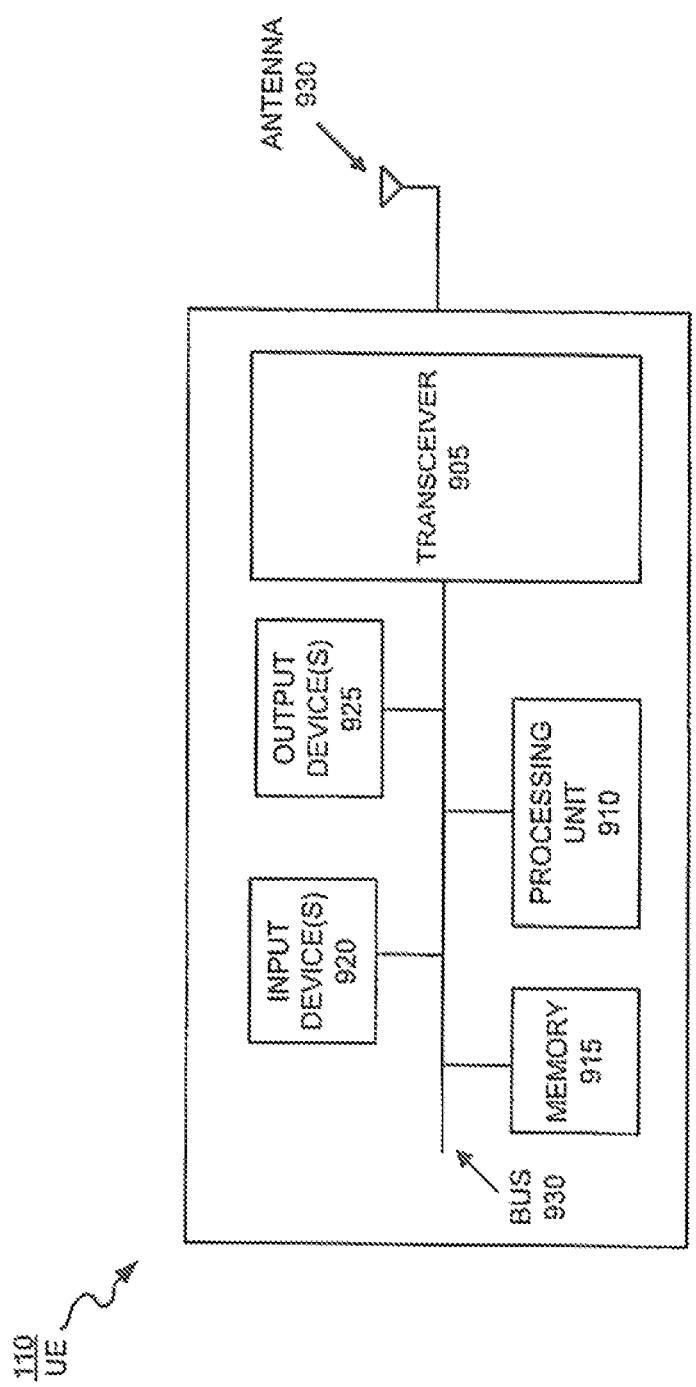
FIG. 9 illustrates exemplary components of a user equipment.

FIG. 9 is a diagram of exemplary components of user equipment 110 of FIG. 8. As illustrated, user equipment 110 may include an antenna 930, a transceiver 905, processing logic 910, a memory 915, an input device(s) 920, an output device(s) 925, and a bus 930.

Antenna 930 may include one or more antennas to transmit and/or receive radio frequency (RF) signals over the air. Antenna 930 may, for example, receive RF signals from transceiver 905 and transmit the RF signals over the air to an eNB and receive RF signals over the air from said eNB and provide the RF signals to transceiver 905.

Transceiver 905 may include, for example, a transmitter that may convert baseband signals from processing logic 910 to RF signals and/or a receiver that may convert RF signals to baseband signals. Alternatively, transceiver 905 may include a transceiver to perform functions of both a transmitter and a receiver. Transceiver 905 may connect to antenna 930 for transmission and/or reception of the RF signals.

Processing logic 910 may include a processor, microprocessor, an application specific integrated circuit (ASIC), field programmable gate array (FPGA), or the like. Processing logic 910 may control operation of user equipment 110 and its components.

Memory 915 may include a random access memory (RAM), a read only memory (ROW and/or another type of memory to store data and instructions that may be used by processing logic 910. Input device(s) 920 may include mechanisms for entry of data into user equipment 110. For example, input device(s) 920 may include input mechanisms, such as microphone 810, input elements 830, display 840, etc. Output device(s) 925 may include mechanisms for outputting data in audio, video and/or hard copy format. For example, output device(s) 925 may include speaker 820, display 840, etc. Bus 930 may interconnect the various components of user equipment 110 to permit the components to communicate with one another.

Although FIG. 9 shows exemplary components of user equipment 110, in other implementations, user equipment 110 may contain fewer, different, or additional components than depicted in FIG. 9. In still other implementations, one or more components of user equipment 110 may perforin the tasks described as being performed by one or more other components of user equipment 110.

Figure 10:
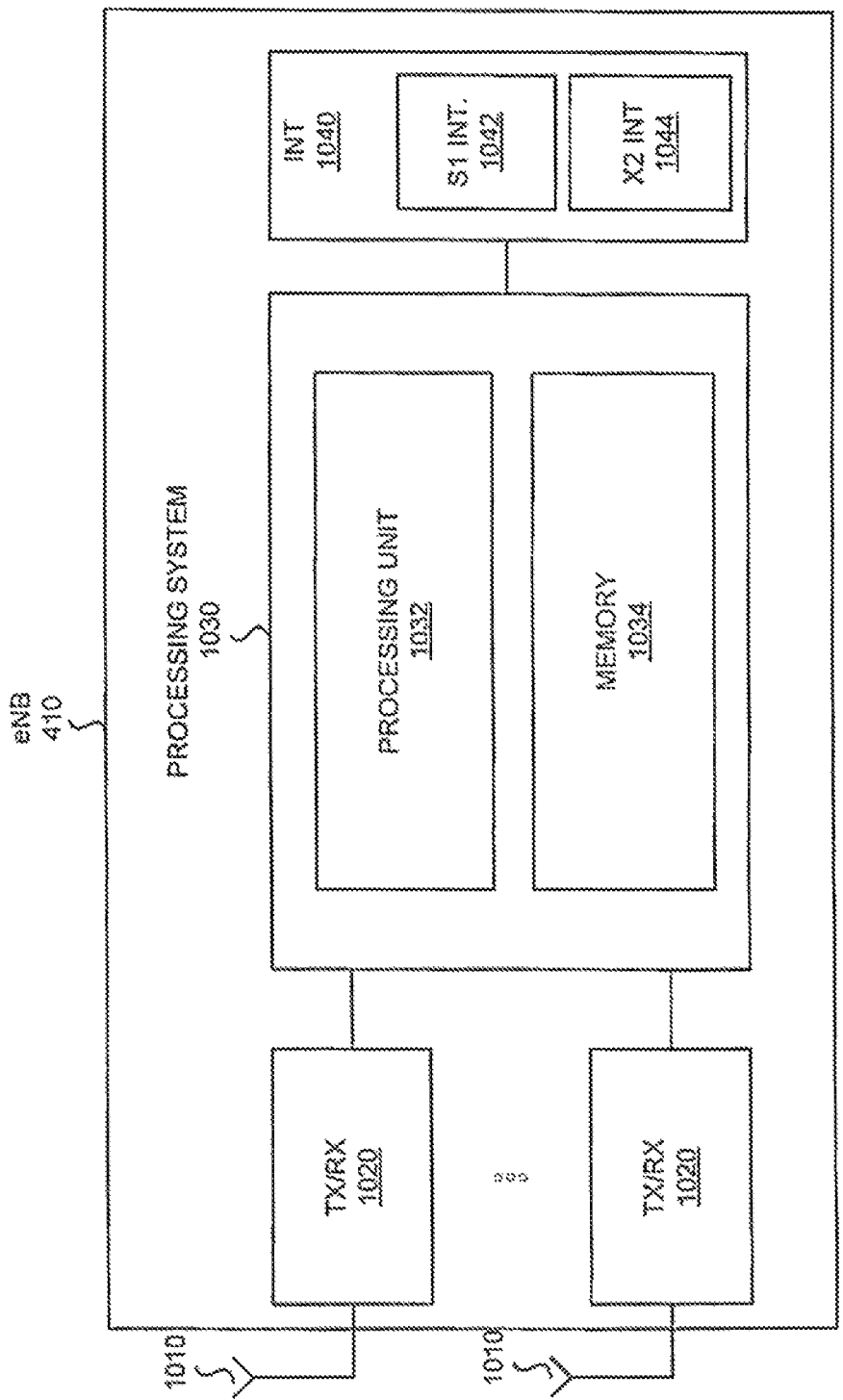
FIG. 10 illustrates exemplary components of an eNB.

FIG. 10 is a diagram of exemplary components of eNB 410. eNB 410 may be similarly configured. As illustrated, eNB 410 may include antennas 1010, transceivers 1020, a processing system 1030, and an interface 1040.

Antennas 1010 may include one or more directional and/or omni-directional antennas. Transceivers 1020 may be associated with antennas 1010 and include transceiver circuitry for transmitting, and/or receiving symbol sequences in a network, such as network 100, via antennas 1010.

Processing system 1030 may control the operation of eNB 410. Processing system 1030 may also process information received via transceivers 1020 and interface 1040. As illustrated, processing system 1030 may include processing logic 1032 and a memory 1034. It will be appreciated that processing system 1030 may include additional and/or different components than illustrated in FIG. 10.

Processing logic 1032 may include a processor, microprocessor, an ASIC, FPGA, or the like. Processing logic 1032 may process information received via transceivers 1020 and interface 1040. The processing may include, for example, data conversion, forward error correction (FEC), rate adaptation, and quadrature phase shift keying (QPSK) modulation, etc. In addition, processing logic 1032 may generate control messages and/or data messages and cause those control messages and/or data messages to be transmitted via transceivers 1020 and/or interlace 1040. Processing logic 1032 may also process control messages and/or data messages received from transceivers 1020 and/or interface 1040. Memory 1034 may include a RAM, a ROM, and/or another type of memory to store data and instructions that may be used by processing logic 1032.

Interface 1040 may include one or more line cards that allow eNB 410 to transmit data to and receive data from other devices over wired and/or wireless connections. As illustrated, interface 1040 may include an S1 interface 1042 that allows eNB 410 to communicate, for example, with a MME/GW 120, and an X2 interface 1044 that allows eNB 410 to communicate with another eNB.

eNB 410 may perform certain operations in response to processing logic 1032 executing software instructions contained in a computer-readable medium, such as memory 1034. A computer-readable medium may be defined as one or more physical and/or logical memory devices. The software instructions may be read into memory 1034 from another computer-readable medium or from another device via interface 1040. The software instructions contained in memory 1034 may cause processing logic 1032 to perform processes described herein. Alternatively, hardwired circuitry may be used in place of or in combination with software instructions to implement processes described herein. Thus, embodiments described herein are not limited to any specific combination of hardware circuitry and software.

Although FIG. 10 shows exemplary components of eNB 410, in other implementations, eNB 410 may contain fewer, different, or additional components than depicted in FIG. 10. In still other implementations, one or more components of eNB 410 may perform the tasks described as being performed by one or more other components of eNB 410.

Figure 11:
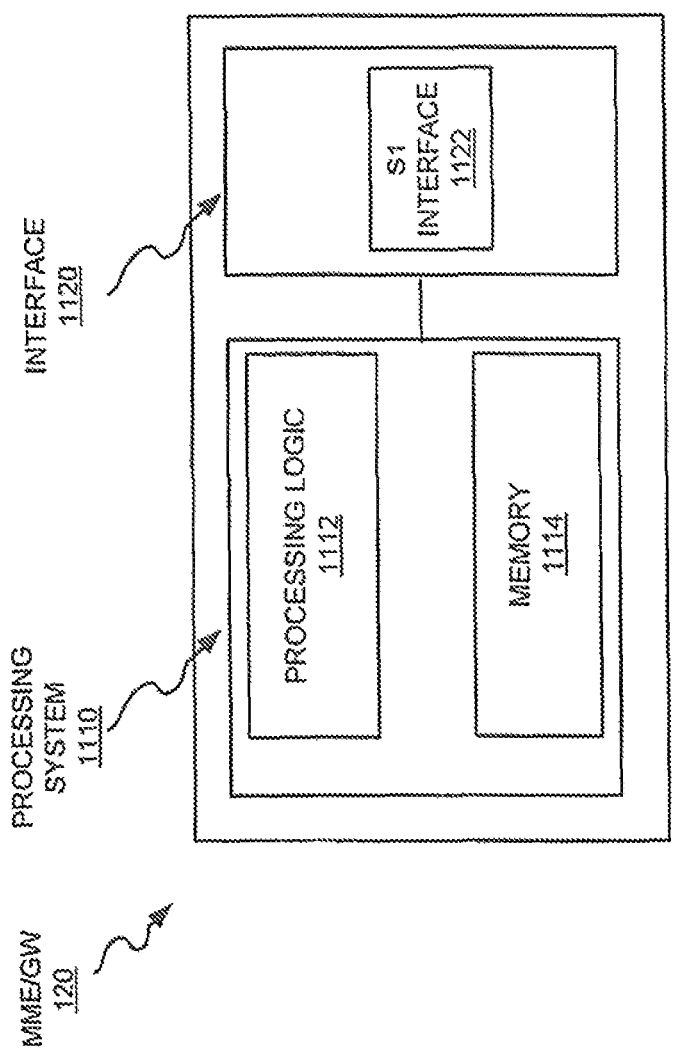
FIG. 11 illustrates exemplary components of a Mobility Management Entity or Gateway (MIME or GW).

FIG. 11 is a diagram of exemplary components of MME/GW 120. MME/GW 120 may be similarly configured. As illustrated, MME/GW 120 may include a processing system 1110 and an interface 1120.

Processing system 1110 may control the operation of MME/GW 120. Processing system 1110 may also process information received, via interface 1120. As illustrated, processing system 1110 may include processing logic 1112 and a memory 1114. It will be appreciated that processing system 1110 may include additional and/or different components than illustrated in FIG. 11.

Processing logic 1112 may include a processor, microprocessor, an ASIC, FPGA, or the like. Processing logic 1112 may process information received via interface 1120. In addition, processing logic 1112 may generate control messages and/or data messages and cause those control messages and/or data messages to be transmitted via interface 1120. Processing logic 1112 may also process control messages and/or data messages received from interface 1120. Memory 1114 may include a RAM, a ROM, and/or another type of memory to store data and instructions that may be used by processing logic 1112.

Interface 1120 may include one or more line cards that allow MME/GW 120 to transmit data to and receive data from other devices over wired and/or wireless connections. As illustrated, interface 1120 may include an S1 interface 1122 that allows MME/GW 120 to communicate, for example, with an eNB. It will be appreciated that interface 1120 may include additional interfaces than illustrated in FIG. 11. For example, interface 1120 may include an interface for communicating with another network, such as a PDN.

MME/GW 120 may perform certain operations in response to processing logic 1112 executing software instructions contained in a computer-readable medium, such as memory 1114. The software instructions may be read into memory 1114 from another computer-readable medium or from another device via interface 1120. The software instructions contained in memory 1114 may cause processing logic 1112 to perform processes described herein. Alternatively, hardwired circuitry may be used in place of or in combination with software instructions to implement processes described herein. Thus, embodiments described herein are not limited to any specific combination of hardware circuitry and software.

Although FIG. 11 shows exemplary components of MME/GW 120, in other implementations, MME/GW 120 may contain fewer, different, or additional components than depicted in FIG. 11. In still other implementations, one or more components of MME/GW 120 may perform the tasks described as being performed by one or more other components of MME/GW 120.

Below the embodiments of the present solution which will be described in more detail, reference is made to FIG. 7 which is a combined signalling scheme and flowchart of an exemplary process.

Step 700 a Network Node 410, servicing a user equipment 110 residing in a Packet Switched domain, transmits an indication to the User equipment 110, the indication comprises information to the user equipment 110 that Circuit Switched Services are supported and that the Network Node 410 may enable a Circuit Switched fallback mechanism to a legacy network 420. In some embodiments, the Circuit Switched fallback mechanism enables fallback from the E-UTRAN network towards the CDMA2000 network.

Step 705 the user equipment 110, which resides/camps in the Packet Switched domain, i.e. LTE or has ongoing services in the Packet Switched domain, i.e. LTE, accordingly receives the indication transmitted from the Network Node 410, that Circuit Switched Services are supported.

Step 710 the Network Node 410, follows the transmitted indication by tunneling a signaling procedure, further described in step 715 below, enabling the User Equipment 110 to register to the Circuit Switched domain.

Step 715, in response to the received indication of step 705 the user equipment 110 performs one or more attempts to initiate a signaling procedure, via the Network Node 410 enabling registry to the Circuit Switched domain.

The user equipment 110, thus after receiving the indication that Circuit Switched services are supported therefore performs a registration with the Circuit Switched domain. The registration signaling is tunneled transparently through the Packet Switched system, i.e. the LTE system, via a Third Node 120, i.e. the MIME, towards the 1xRTT network 420, i.e. the CDMA2000 network.

The detailed signaling path on the CDMA2000 network side is tunneled transparently through the LTE system and in FIG. 1 is shown the solution where the signaling is piggybacked on registration signaling for HRPD, but other solutions are also possible e.g. where the signaling is performed over the S102 interface between the MME 120 and an 1xCS inter-working function. Once the registration is completed, the user equipment 110 is known in the 1xRTT Mobile Switching Centre (CS-MSC) 150 and can from thereon receive incoming Circuit Switched services, i.e. Circuit Switched voice calls.

Step 720, should the user equipment 110 be in Idle Mode; i.e. no on-going Packet Switched Services and the Mobile Switching Centre of the Circuit Switched network (CS-MSC) 150 receives an incoming Circuit Switched service, i.e. an incoming Circuit Switched voice call, the CS-MSC 150 generates a page message, which is tunneled via the LTE network and received at the user equipment 110 on the paging channel. The user equipment 110 is thus aware of an incoming Circuit Switched service and the user equipment 110, after having received the page message, then performs a transition from Idle Mode to LTE Active Mode (i.e. RRC connected). The CS-MSC 150 is not aware of which state the user equipment 110 is in, so it always sends a page message to the MME 120 regardless of state. The MME 120 is responsible for making sure this is message is delivered. And in case the user equipment 110 is in Idle mode it will first page the user equipment 110 with a normal LTE page and then deliver the 1xRTT Circuit Switched page as a tunneled message to the user equipment 110

Should the User Equipment 110 be in Idle Mode and about to initiate a Circuit Switched Service, the User Equipment 110 only has to perform a transition from Idle Mode to LTE Active Mode.

Step 725 once the User Equipment 110 is in LTE Active Mode, either the User Equipment 110 can send a request for Circuit Switched Services to the Network Node 410 and inform the network that the User Equipment 110 is about to perform a transition from the Packet Switched domain to the Circuit Switched domain, enabling Circuit Switched Services, or in Step 730 the Network Node 410 can receive a request message from a Third Node 120, i.e. a MME, that the User Equipment 110 is having incoming Circuit Switched Services and is about to perform a transition from the Packet Switched domain to the Circuit Switched domain, enabling the Circuit Switched Services.

Step 740 once the Network Node 410 is aware that the User Equipment 110 is about to perform a Circuit Switched fallback, enabling Circuit Switched services, the Network Node 410 will send a message to the User Equipment 110 informing the User Equipment 110 to leave the Packet Switched domain (i.e. leave LTE) and also informing the User Equipment 110 of the specific Circuit Switched parameters needed for this transition.

In some embodiments the message comprise the 3G1x parameters as specified in C.S0024-A; and in particular the parameters; 1xRTT frequency band, 1xRTT carrier frequency, PN offset (which in principle means the physical cell identity of the target cell), CDMA system time, Long Code State (needed by the User Equipment 110 to decode downlink channels in 1xRTT). Some of these parameters (e.g. CDMA system time) can, as an alternative, be provided on the LYE broadcast channel.

In some embodiments the message can be an extension of an existing RRC connection Release with re-direction message, or a handover message.

Step 745 the User Equipment 110 receives the Circuit Switched specific information, including the parameters as above in order to help the User Equipment 110 to access the target system/cell with minimum delay. In the listing below is illustrated 3G1xParameters from C.S0024-A

| | | | |
|---|---|---|---|
| MessageID | ENCRYPT_MODE Included | MAX_ADD_SERV_INSTANCE | IMSI_T_SUPPORTED Included |
| TransactionID | ENCRYPT_MODE | HOME_REGIncluded | IMSI_T_SUPPORTED |
| 3G1XParameters | ENC_SUPPORTEDIncluded | HOME_REG | RECONNECT_MSG_IND Included |
| Signature | | | |
| SIDIncluded | ENC_SUPPORTED | FOR_SID_REGIncluded | RECONNECT_MSG_IND |
| SID | SIG_ENCRYPT_SUP Included | FOR_SID_REG | RER_MODE_SUPPORTED Included |

| | | | |
|---|---|---|---|
| NIDIncluded | SIG_ENCRYPT_SUP MSG_INTEGRITY_SUP Included | FOR_NID_REGIncluded | RER_MODE_SUPPORTED |
| NID | MSG_INTEGRITY_SUP | FOR_NID_REG | TKZ_MODE_SUPPORTED Included |
| REG_ZONEIncluded | SIG_INTEGRITY_SUP_INCL Included | POWER_UP_REGIncluded | TKZ_MODE_SUPPORTED |
| REG_ZONE | SIG_INTEGRITY_SUP_INCL | POWER_UP_REG | TKZ_IDIncluded |
| TOTAL_ZONES Included | SIG_INTEGRITY_SUPIncluded | POWER_DOWN_REG Included | TKZ_ID |
| TOTAL_ZONES | SIG_INTEGRITY_SUP | PARAMETER_REG Included | PILOT_REPORTIncluded |
| ZONE_TIMER Included | AUTHIncluded | PARAMETER_REG | PILOT_REPORT |
| ZONE_TIMER | AUTH | REG_PRDIncluded | SDB_SUPPORTEDIncluded |
| PACKET_ZONE_ID Included | MAX_NUM_ALT_SOIncluded | REG_PRD | SDB_SUPPORTED |
| PACKET_ZONE_ID | MAX_NUM_ALT_SO | REG_DISTIncluded | AUTO_FCSO_ALLOWED Included |
| PZIDHystParameters Included | USE_SYNC_IDIncluded | REG_DIST | AUTO_FCSO_ALLOWED |
| PZ_HYST_ENABLED | USE_SYNC_ID | PREF_MSID_TYPE Included | SDB_IN_RCNM_IND Included |
| PZ_HYST_INFO_INCL | MS_INIT_POS_LOC_SUP_IND Included | PREF_MSID_TYPE | SDB_IN_RCNM_IND |
| PZ_HYST_LIST_LEN | MS_INIT_POS_LOC_SUP_IND | EXT_PREF_MSID_TYPE Included | FPC_FCH_Included |
| PZ_HYST_ACT_TIMER | MOB_QOSIncluded | EXT_PREF_MSID_TYPE | FPC_FCH_INIT_SETPT_RC3 |
| PZ_HYST_TIMER_MUL | MOB_QOS | MEID_REQDIncluded | FPC_FCH_INIT_SETPT_RC4 |
| PZ_HYST_TIMER_EXP | BAND_CLASS_INFO_REQ Included | MEID_REQD | FPC_FCH_INIT_SETPT_RC5 |
| P_REVIncluded | BAND_CLASS_INFO_REQ | MCCIncluded | T_ADD_Included |
| P_REV | ALT_BAND_CLASSIncluded | MCC | T_ADD |
| NEG_SLOT_CYCLE_INDEX_SUP Included | ALT_BAND_CLASS | IMSI_11_12Included | PILOT_INC_Included |
| NEG_SLOT_CYCLE_INDEX_SUP | MAX_ADD_SERV_INSTANCE Included | IMSI_11_12 | PILOT_INC |

Step 755 preparing, for using Circuit Switched services, in the case with parameters provided on the LTE broadcast channel it is assumed that the User Equipment 110 at the time of Circuit Switched fallback already has acquired these parameters so that they can be used by the User Equipment 110 when accessing the 1xRTT system to reduce the delay.

The 1xRTT frequency band, 1xRTT carrier frequency tells the User Equipment 110 which frequency the User Equipment 110 should access. The PN offset tells the User Equipment 110 which cell on that frequency and together with the CDMA system time the User Equipment 110 would obtain downlink synchronization with the target cell. The 3G1xParameters are needed for the User Equipment 110 to be able to start signaling towards the 1xRTT network.

Step 765 once the User Equipment 110 has received and prepared the parameter setting it continues with switching from Packet Switched to Circuit Switched domain (i.e. leaving LTE).

Step 770 the eNB then starts transmitting a Circuit Switched service

Step 775 the User Equipment 110 is then ready to receiving a Circuit Switched service

The invention claimed is:

1. A method for handling Circuit Switched Fallback, in a User Equipment residing in a Packet Switched domain, comprising:
receiving an indication that Circuit Switched Fallback is supported from an eNodeB located within the Packet Switched domain;
registering to a Circuit Switched domain associated with Circuit Switched Fallback by tunneling Circuit Switched Registration information, via the eNodeB, to the Circuit Switched domain, enabling the User Equipment to setup a Circuit Switched call or receive a Circuit Switched page;
receiving a Circuit Switched specific parameter setting from the eNB, wherein the Circuit Switched specific parameter setting comprises a message that includes at least one of a 1xRTT frequency band or a 1xRTT carrier frequency utilized by the Circuit Switched domain;
preparing for using Circuit Switched Fallback by applying the received Circuit Switched specific parameter setting; and
switching from the Packet Switched domain to the Circuit Switched domain;
wherein the message further comprises a CDMA system time or a Long Code State or a combination thereof.

2. The method of claim 1, wherein the message comprises a release and re-direct indication.

3. The method of claim 1, further comprising receiving an indication of an incoming Circuit Switched Service from the eNodeB.

4. The method of claim 1, wherein the User Equipment is in idle mode, the method further comprising:
transiting the User Equipment from idle mode to active mode after registry to the Circuit Switched domain associated with Circuit Switched Fallback.

5. A method for handling Circuit Switched Fallback, in an eNodeB residing in a Packet Switched domain, comprising;
transmitting an indication that Circuit Switched Fallback is supported to a User Equipment located within the Packet Switched domain enabling the User Equipment to register to a Circuit Switched domain associated with Circuit Switched Fallback by tunneling Circuit Switched Registration information, via the eNodeB, to the Circuit Switched domain, thereby enabling the User Equipment to setup a Circuit Switched call or receive a Circuit Switched page;

receiving either a request for a Circuit Switched Service from the User Equipment, or an indication from another node, that a Circuit Switched Service is requested; and transmitting a Circuit Switched specific parameter setting to the User Equipment, wherein the Circuit Switched specific parameter setting comprises a message that includes at least one of a 1xRTT frequency band or a 1xRTT carrier frequency utilized by the Circuit Switched domain;

wherein the message further comprises a CDMA system time or a Long Code State or a combination thereof.

6. The method of claim 5, wherein the message comprises a release and re-direct indication.

7. An apparatus enabling Circuit Switched Fallback in a User Equipment residing in a Packet Switched domain, the apparatus comprising:

a receiver configured to receive, from an eNodeB located within the Packet Switched domain, an indication that Circuit Switched Fallback is supported;

a transceiver configured to register to a Circuit Switched domain associated with Circuit Switched Fallback by tunneling Circuit Switched Registration information via the eNodeB to the Circuit Switched domain enabling the User Equipment to setup a Circuit Switched call or receive a Circuit Switched page;

a receiver configured to receive a Circuit Switched specific parameter setting, wherein the Circuit Switched specific parameter setting comprises a message that includes at least one of a 1xRTT frequency band or a 1xRTT carrier frequency utilized by the Circuit Switched domain; and a processor configured to prepare for using Circuit Switched Fallback by applying the received Circuit Switched specific parameters and switching to the Circuit Switched domain;

wherein the message further comprises a CDMA system time or a Long Code State or a combination thereof.

8. The apparatus of claim 7, wherein the message comprises a release and re-direct indication.

9. The apparatus of claim 7, further comprising:

a receiver configured to receive an incoming Circuit Switched Service from the eNodeB.

10. The apparatus of claim 7, wherein the User Equipment is in idle mode, and the apparatus further comprises a processor configured to transit the User Equipment from idle mode to active mode after registry to the Circuit Switched domain associated with Circuit Switched Fallback.

11. An apparatus enabling Circuit Switched Fallback in an eNodeB residing in a Packet Switched domain, the apparatus comprising:

a transmitter configured to transmit an indication that a Circuit Switched Fallback is supported to a User Equipment located within the Packet Switched domain enabling the User Equipment to register to a Circuit Switched domain associated with Circuit Switched Fallback by tunneling Circuit Switched Registration information, via the eNodeB, to the Circuit Switched domain and thereby enabling the User Equipment to setup a Circuit Switched call or receive a Circuit Switched page;

a receiver configured to receive either a request for a Circuit Switched Service from the User Equipment, or an indication from another node, that Circuit Switched Service is requested; and the transmitter configured to transmit a Circuit Switched specific parameter setting to the User Equipment, wherein the Circuit Switched specific parameter setting comprises a message that includes at least one of a 1xRTT frequency band or a 1xRTT carrier frequency a utilized by the Circuit Switched domain;

wherein the message further comprises a CDMA system time or a Long Code State or a combination thereof.

12. The apparatus of claim 11, wherein the message comprises a release and re-direct indication.

* * * * *

UNITED STATES PATENT AND TRADEMARK OFFICE
CERTIFICATE OF CORRECTION

| | | |
|---|---|---|
| PATENT NO. | : 9,014,090 B2 | Page 1 of 3 |
| APPLICATION NO. | : 13/618615 | |
| DATED | : April 21, 2015 | |
| INVENTOR(S) | : Mildh | |

It is certified that error appears in the above-identified patent and that said Letters Patent is hereby corrected as shown below:

On Title Page 2, in item (56), under "OTHER PUBLICATIONS", in Column 1, Line 6, delete "tabel of" and insert -- table of --, therefor.

On Title Page 2, in item (56), under "OTHER PUBLICATIONS", in Column 2, Line 8, delete "Circuite" and insert -- Circuit --, therefor.

In the Drawings

In Fig. 1, Sheet 1 of 11, in Step "1.", in Line 1, delete "HPRD" and insert -- HRPD --, therefor.

In the Specification

In Column 1, Line 42, delete "mechanisms;" and insert -- mechanisms, --, therefor.

In Column 2, Line 52, delete "comprising." and insert -- comprising --, therefor.

In Column 2, Line 53, delete "setting," and insert -- setting --, therefor.

In Column 3, Line 1, delete "receiving," and insert -- receiving --, therefor.

In Column 3, Line 6, delete "Switched." and insert -- Switched --, therefor.

In Column 3, Line 28, delete "fullback" and insert -- fallback --, therefor.

In Column 3, Line 31, delete "i.e." and insert -- (i.e. --, therefor.

In Column 3, Line 48, delete "setting," and insert -- setting --, therefor.

Signed and Sealed this
Eighteenth Day of August, 2015

Michelle K. Lee
*Director of the United States Patent and Trademark Office*

CERTIFICATE OF CORRECTION (continued)
U.S. Pat. No. 9,014,090 B2

In Column 3, Line 53, delete "tailback" and insert -- fallback --, therefor.

In Column 4, Line 6, delete "solutions;" and insert -- solutions. --, therefor.

In Column 4, Line 8, delete "solutions;" and insert -- solutions. --, therefor.

In Column 4, Line 10, delete "according," and insert -- according --, therefor.

In Column 4, Line 10, delete "solutions;" and insert -- solutions. --, therefor.

In Column 4, Line 13, delete "invention;" and insert -- invention. --, therefor.

In Column 4, Line 30, delete "(MIME" and insert -- (MME --, therefor.

In Column 4, Line 64, delete "Mile" and insert -- time --, therefor.

In Column 5, Line 51, delete "wilt" and insert -- will --, therefor.

In Column 5, Line 54, delete "network" and insert -- network. --, therefor.

In Column 7, Line 16, delete "(ROW" and insert -- (ROM), --, therefor.

In Column 7, Line 32, delete "perforin" and insert -- perform --, therefor.

In Column 7, Line 42, delete "transmitting," and insert -- transmitting --, therefor.

In Column 7, Line 60, delete "interlace" and insert -- interface --, therefor.

In Column 8, Line 28, delete "GW 120," and insert -- GW 120. --, therefor.

In Column 8, Line 33, delete "received," and insert -- received --, therefor.

In Column 9, Line 42, delete "MIME," and insert -- MME, --, therefor.

In Column 10, Line 15, delete "110" and insert -- 110. --, therefor.

In Column 10, Line 48, delete "LYE" and insert -- LTE --, therefor.

In Column 11, Line 35, delete "preparing," and insert -- preparing --, therefor.

In Column 11, Line 54, delete "service" and insert -- service. --, therefor.

In Column 11, Line 56, delete "service" and insert -- service. --, therefor.

In the Claims

In Column 14, Line 32, in Claim 11, delete "frequency a" and insert -- frequency --, therefor.